United States Patent [19]

Werz et al.

[11] Patent Number: 4,544,342

[45] Date of Patent: Oct. 1, 1985

[54] DEVICE FOR THE MANUFACTURE OF PRESSED PROFILED BODIES

[75] Inventors: Jakob F. Werz; Edmünd Münk, both of Oberstenfeld, Fed. Rep. of Germany

[73] Assignee: Werzalit-Werke J. F. Werz KG, Ludwigsburg, Fed. Rep. of Germany

[21] Appl. No.: 623,487

[22] Filed: Jun. 22, 1984

[30] Foreign Application Priority Data

Jul. 9, 1983 [EP] European Pat. Off. ........... 83106759

[51] Int. Cl.[4] ............................ B29J 5/08; B30B 1/32

[52] U.S. Cl. .................................... 425/193; 425/359; 425/410

[58] Field of Search ............... 425/261, 357, 359, 406, 425/407, 408, 409, 410, 411, 595, 193, 195, 259

[56] References Cited

U.S. PATENT DOCUMENTS

| | | | |
|---|---|---|---|
| 1,607,073 | 11/1926 | Gros | 425/411 X |
| 2,718,030 | 9/1955 | Collins et al. | 425/411 |
| 3,068,512 | 12/1962 | Van Houten | 425/411 X |
| 3,166,617 | 1/1965 | Munk | 425/410 X |
| 3,204,292 | 9/1965 | Schon | 425/411 X |
| 3,261,897 | 7/1966 | Munk | 425/410 X |
| 3,534,439 | 10/1970 | Haas et al. | 425/411 X |
| 3,830,613 | 8/1974 | Aoki | 425/595 X |
| 3,975,127 | 8/1976 | Munk et al. | 425/357 |

FOREIGN PATENT DOCUMENTS 2309975 9/1974 Fed. Rep. of Germany .

*Primary Examiner*—J. Howard Flint, Jr.
*Attorney, Agent, or Firm*—Michael J. Striker

[57] ABSTRACT

A device for the manufacture of pressed profiled bodies from a non ascending mixture and including a raisable and depressable heated pressing tool upper part formed as a flat plate, at least one pressing tool lowerpart disposed below the pressing tool upper part and having a cavity containing the mixture to be pressed, a reversible raisable and depressible frame surrounding the cavity and having a side facing the pressing tool upperpart, and a frame part disposed on the side of the frame and movable towards the pressing tool upper part.

5 Claims, 2 Drawing Figures

DEVICE FOR THE MANUFACTURE OF PRESSED PROFILED BODIES

BACKGROUND OF THE INVENTION

The present invention relates to a device for the manufacture of pressed profiled bodies. More particularly it relates to a device for the manufacture of pressed profiled bodies from a non ascending mixture and consists of a risable and depressable heated pressing tool upper part and has arranged under the pressing tool upper part a movable pressing tool lower part which receives in a hollow space the mixture to be pressed. The hollow space is surrounded with a frame provided with reversible raising and lowering device.

Devices for the manufacture of pressed profiled bodies of the above mentioned general type are known in the art. One such device for the manufacture of pressed profiled bodies is disclosed, for example, in the DE-PS No. 23 09 975. This device is arranged with a hot pressing tool upper part, a hot pressing tool lower part, and a preliminary pressing tool lower part. The hot pressing tool lower part and the preliminary pressing tool lower part are horizontally movable and act together in such a manner so that they alternate with the hot pressing tool upper part.

Presses for the manufacture of pressed profiled bodies from a non ascending mixture are designed, as a rule in such a manner, so that the pressing tool upper part and the pressing tool lower part are profiled according to the shape of the profiled body to be pressed.

Such a press, possess however, the characteristic that only the same profiled body can be prepared at the same time. If with the same press, another profiled body has to be prepared, then it becomes necessary for the press to be changed over to another pressing tool. Sometimes however, the production capacity of the press for the manufacture of a profiled body is too large and it would be desirous with the same two presses to be able to press different profiled bodies, without having to change the pressing tool.

SUMMARY OF THE INVENTION

Accordingly, it is an object of the present invention to provide a device for the manufacture of pressed profiled bodies which avoids the disadvantages of the prior art.

More particularly, it is an object of the present invention to provide a device for the manufacture of pressed profiled bodies which can produce different profiled bocies which can be pressed at the same time from a non-ascending mixture.

In keeping with these objects, and with others which will become apparent hereinafter, one feature of the present invention resides, briefly stated, in a device for the manufacture of pressed profiled bodies from a non ascending mixture and having a raisable and depressable heated pressing tool upper part formed as a flat plate, at least one pressing tool lower part disposed below the pressing tool upper part and having a cavity containing the mixture to be pressed, and a reversible raisable and depressable frame surrounding the cavity and having a side facing the pressing tool upper part wherein a frame part is disposed on the side of the frame and is movable towards the pressing tool upper part.

When the device for the manufacture of pressed profiled bodies is designed in accordance with the present invention, a frame part is disposed on the side of the frame and is movable towards the pressing tool upper part, so that the pressing tool lower part can be loaded and unloaded quickly and a plurality of different profiled bodies can be produced simultaneously.

In accordance with another feature of the present invention, a second pressing tool lower part is provided.

Still another feature of the present invention is that the two pressing tool lower parts are jointly movable between filling, pressing, and discharge positions relative to the pressing tool upper part.

A further feature of the present invention is that the filling and discharging positions are at the same location relative to the pressing tool upper part.

Still a further feature of the present invention is that the frame part is swingable to move sideways.

Finally, still a further feature of the present invention is that the frame part is attached to a lateral mounting so that the frame part is lifted by the lateral mounting before the mixture is placed in the pressing tool lower part and swings out of the way from the pressing tool lower part.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
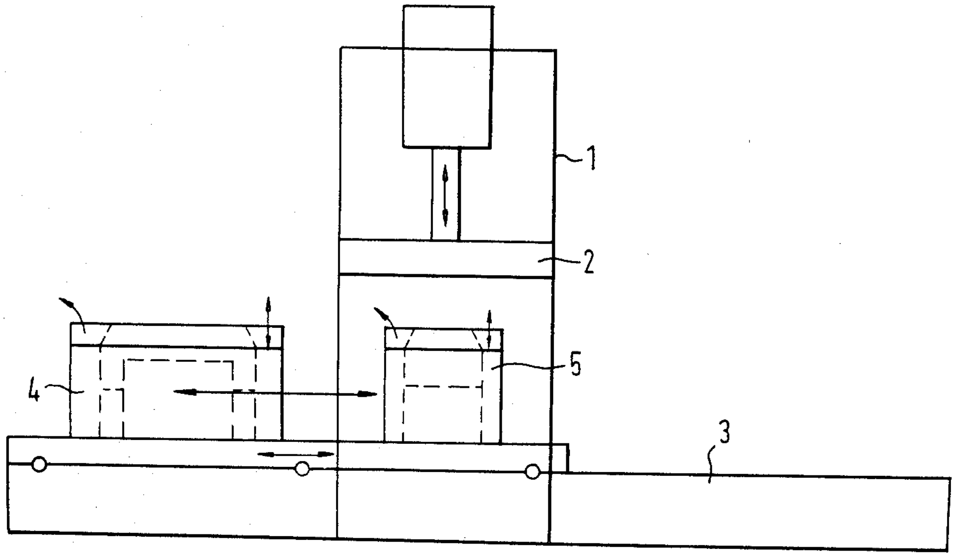
FIG. 1 is schematic of the new press according to the present invention.

FIG. 1 shows a press in which a pressing tool upper part 2, which can be lowered, is attached to a frame 1. On a press table 3 are arranged both pressing tool lower parts 4 and 5 which are together horizontally slidable. The pressing tool lower part 4 is in the filling position and the pressing tool lower part 5 is in the pressing position. When the pressing tool lower part 5 with the existing mixture is pressed, then both pressing tool lowerparts 4 & 5 are moved to the right. The pressing tool lower part 4 thereby moves into the press, so that the mixture existing in it is pressed, and the pressing tool lower part 5 comes out from the press, so that the pressed profiled body can be removed.

Figure 2:
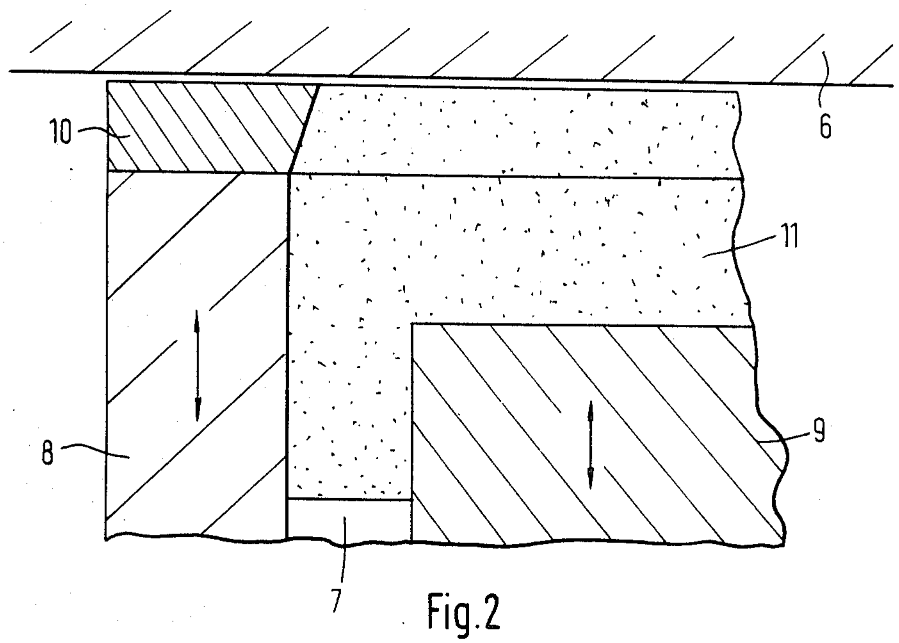
FIG. 2 is a view of a particular detail of the present invention according to FIG. 1.

In FIG. 2 is clearly shown, the refinements of the pressing tool upper part 2 and the pressing tool lower parts 4 and 5. The pressing tool lower parts face towards part of the pressing tool upper part 2 which is designed as a plane surface. The pressing tool lowerparts 4 and 5 exist, on one hand in the known way of a fixed part 7, a frame 8 and a mid portion 9. Frame 8 and mid portion 9 are arranged to be vertically raisable and depressable. On the side of the frame 8 is arranged a removable frame part 10. Before pressing, a space 11 is filled with the mixture.

The frame part 10 is in the form corresponding to the forms of the profiled bodies to be pressed. The frame part 10 can, by way of example, have its movable side designed to be attached on the frame 8 by means of a frame joint, so that when the pressing tool lower parts are charged, the frame part 10 can be swung out and away as indicated by the arrows in FIG. 1.

It is conceivable, however for another possibility to move the frame part 10. The frame part 10 can be attached to a lateral mounting, which thoroughly lifts before the charging of the pressing tool lower part and swings out of the way from the area of the pressing tool lower part.

The power press is used to press profiled bodies such as outer and inner lining profiles for highrise constructions for lining balconies, table plates and the like, pressed from a non-ascending mixture with a thermohardening bonding agent mixed with fibrous materials. The present invention can also shape with cold pressing as well as with hot pressing.

The non-ascending mixture is composed mostly from ligno cellulose-containing fibrous materials, such as crushed and dried shavings, fibers of crushed sugar cane, etc, mixed with a thermohardening artificial or synthetic resin, such as melaminurea formaldehyde or phenol formaldehyde resin. Instead of crushed and dried wood or fibers of crushed sugar cane, threads of another material, such as glassfibers, matte wood or asbestos fibers, either singularly or mixed together, can be used and to which corresponding preferably organic binding agents are added.

With a decorative layer to be provided on the profiled body the profiled body is manufactured in such a way that a rough pressed block is first made from the mixture by old pressing, which can then be provided with a cover layer on its lower side, that is, on the outer surface of the profiled body which is not used as a visible side. For this purpose a rough pressed block which is already very similar to the completed profiled body is pressed from the mixture in a power press. Although during the preliminary pressing of the profiled body the amount of heat necessary for thermohardening of the binding has not been applied, the rough pressed block is already a firm body capable of being handled.

From the rough pressed block, by heat pressing in another power press the completed profiled body is produced.

During the heat pressing, the profiled body as a rule is simultaneously provided with a cover layer, which consists usually of at least one layer, namely, a decorative layer, for instance of a texture, a veneer, or print on paper foil or a plastic foil, over which a transparent protective layer can be arranged. As a protective layer, a so-called overlay-paper is used consisting of a non-filled alpha-cellulose paper on glass fiber fleece which is soaked with a thermosetting plastic mostly on the melamin basis. The transparent protective layer can also be made in such a way that the decorative layer has a stronger resin layer.

It will be understood that each of the elements described above, or two or more together, may also find a useful application in other types of devices for the manufacture of pressed profiled bodies differing from the types described above.

While the invention has been illustrated and described as embodied in a device for the manufacture of pressed profiled bodies, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for the manufacture of pressed profiled bodies from a non ascending mixture, comprising:
- a raisable and depressable heated pressing tool upper part formed as a flat plate;
- at least one pressing tool lowerpart disposed for lateral movement below said pressing tool upper part and having a cavity for containing the mixture to be pressed, and a reversible raisable and depressible frame surrounding said cavity and having a side facing said pressing tool upperpart, said frame including a frame part disposed on said side of said frame and movable sideways relative to said frame.

2. The device as defined in claim 1; further comprising a second pressing tool lower part movably disposed for alternate lateral positioning with said first lower part below said pressing tool upper part and having a second cavity for containing the mixture to be pressed, and a second reversible raisable and depressible frame surrounding said second cavity and having a side facing said pressing tool upper part, said second frame including a second frame part disposed on said side of said second frame and movable sideways relative to said frame.

3. The device as defined in claim 2, wherein said two pressing tool lower parts are jointly movable between filling, pressing and discharging positions relative to said pressing tool upper part.

4. The device as defined in claim 3, wherein said filling and discharging positions are at the same location relative to said pressing tool upper part.

5. The device as defined in claim 1, wherein said frame part is swingable to move sideways.

* * * * *